(12) United States Patent
Chang

(10) Patent No.: US 10,740,150 B2
(45) Date of Patent: Aug. 11, 2020

(54) PROGRAMMABLE STATE MACHINE CONTROLLER IN A PARALLEL PROCESSING SYSTEM

(71) Applicant: X-Drive Technology, Inc., San Jose, CA (US)

(72) Inventor: Darder Chang, San Jose, CA (US)

(73) Assignee: X-Drive Technology, Inc., San Jose, CA (US)

( * ) Notice: Subject to any disclaimer, the term of this patent is extended or adjusted under 35 U.S.C. 154(b) by 163 days.

(21) Appl. No.: 16/033,100

(22) Filed: Jul. 11, 2018

(65) Prior Publication Data

US 2020/0019442 A1    Jan. 16, 2020

(51) Int. Cl.
*G06F 9/50*    (2006.01)
*G06F 9/48*    (2006.01)
*G06F 9/30*    (2018.01)
*G06F 9/448*    (2018.01)

(52) U.S. Cl.
CPC ........ *G06F 9/5027* (2013.01); *G06F 9/30101* (2013.01); *G06F 9/4498* (2018.02); *G06F 9/4843* (2013.01)

(58) Field of Classification Search
CPC .. G06F 9/5027; G06F 9/4498; G06F 9/30101; G06F 9/4843
See application file for complete search history.

(56) References Cited

U.S. PATENT DOCUMENTS

| 2005/0204073 A1* | 9/2005 | Gray ...................... G06F 13/28 710/22 |
| 2008/0288693 A1* | 11/2008 | Todoroki ............... G06F 9/4812 710/262 |
| 2013/0346700 A1* | 12/2013 | Tomlinson .............. G06F 9/526 711/133 |
| 2020/0026560 A1* | 1/2020 | Singh ..................... G06F 9/5005 |
| 2020/0117977 A1* | 4/2020 | Noyes ...................... G06N 3/04 |

* cited by examiner

*Primary Examiner* — Jacob D Dascomb
(74) *Attorney, Agent, or Firm* — Silicon Valley Patent Group LLP; Thomas C. Chan

(57) ABSTRACT

Method and system are disclosed for a programmable state machine controller in a parallel processing system. The programmable state machine controller includes a set of control registers configured to serve a set of application specific engines; a set of task engines configured to access a plurality of application resources in parallel; one or more processors configured to: receive multiple requests from the set of application specific engines, determine availability of the set of task engines and the plurality of application resources being requested, assign the set of task engines to serve the set of application specific engines based on the availability of the set of task engines and the availability of the plurality of application resources being requested, and serve the multiple requests from the set of application specific engines in parallel.

20 Claims, 9 Drawing Sheets

PROGRAMMABLE STATE MACHINE CONTROLLER IN A PARALLEL PROCESSING SYSTEM

FIELD OF THE INVENTION

The present invention relates to the field of data access in data center applications. In particular, the present invention relates to programmable state machine controller in a parallel processing system.

BACKGROUND

FIG. 1A illustrates a conventional software state machine in a parallel processing system. As shown in FIG. 1A, the conventional software state machine may include four states, namely erase 102, suspend erase 104, read 106, and resume erase 108. The software state machine transitions from one state to another state upon certain state transition conditions are met. For example upon observing a first set of transition conditions, the software state machine may transition from erase 102 to suspend erase 104. Similarly, upon observing a second set of transition conditions, the software state machine may transition from suspend erase 104 to read 106. At the state read 106, the software state machine may stay in this state to execute a series of reads, and until the series of reads are completed (which can be a third set of transition conditions), then the software state machine may transition from read 106 to resume erase 108. In state resume erase 108, upon observing a fourth set of transition conditions, the software state machine may return to the state erase 102.

FIG. 1B illustrates an implementation of the conventional software state machine of FIG. 1A in a parallel processing system. In the approach shown in FIG. 1B, a CPU and its associated components are dedicated to implement each software state of FIG. 1A. In this example, CPU1 112 and its associated components can be dedicated to implement the function (i.e. software state) erase 102; CPU2 116 and its associated components can be dedicated to implement the function (i.e. software state) suspend erase 104; CPU3 118 and its associated components can be dedicated to implement the function (i.e. software state) read 106; and CPU4 120 and its associated components can be dedicated to implement the function (i.e. software state) resume erase 108; and so on. The associated components of a CPU, such as CPU1 112, may include a plurality of first-in-first-out random access memories or registers (shown as 113a to 113z) and a plurality of hardware components (shown as 115a to 115z). In addition, the CPUs are communicated with each other through inter-processor communication (IPC) units, such as IPC1, IPC2, IPC3, and IPC4.

There are at least two drawbacks associated with the software state machine shown in FIG. 1A and FIG. 1B. First, although CPUs may operate independent of each other, however, the inter-processor communications among the CPUs, typically through software interrupts, adds inefficiencies to the system and thus adversely impacts the performance of the system. As the number of CPUs increase in the system, the performance benefit of the additional CPUs are less significant as the performance benefits of the additional CPUs are lost in the inefficiencies of inter-processor communications. Second, since each CPU in the software state machine of FIG. 1B is dedicated to implement a particular function, when one CPU is performing a particular function, such as an erase operation or a read operation, the other CPUs are typically idle, which may further introduce inefficiencies to the system.

FIG. 1C illustrates a conventional hardware state machine. Similar to FIG. 1A, the hardware state machine includes states erase 102, suspend erase 104, read 106, and resume read 108. In the conventional hardware state machine shown in FIG. 1C, the hardware states and the transitions among the hardware states are typically implemented with application specific hardware or dedicated CPUs and their associated components. There are at least two drawbacks with the conventional hardware state machine. First, since the implementation of the hardware states and the transitions among the hardware states are fixed in application specific hardware or dedicated CPUs and their associated components, if there is a mistake in the implementation, the entire system needs to be manufactured to include the fixes, which can be extremely costly and may cause months of delay to the development of the system. Second, since the implementation of the hardware states and the transitions among the hardware states are fixed in application specific hardware or dedicated CPUs and their associated components, this implementation prevents the option of adding another state to the hardware state machine, in the event when there is a need to add a new function to the system or to temporarily add a new state to the system for debugging purposes.

Therefore, there is a need for methods and systems that address the issues of the conventional state machines described above. Specifically, there is a need for programmable state machine controller in a parallel processing system.

SUMMARY

Methods and systems are disclosed for programmable state machine controller in a parallel processing system. In one embodiment, a programmable state machine controller in a parallel processing system may include a set of control registers configured to serve a corresponding set of application specific engines, a set of task engines configured to access a plurality of application resources in parallel, and one or more processors configured to: receive multiple requests from the set of application specific engines for accessing the plurality of application resources, determine availability of the set of task engines, determine availability of the plurality of application resources being requested, assign the set of task engines to serve the set of application specific engines based on the availability of the set of task engines and the availability of the plurality of application resources being requested, and serve the multiple requests from the set of application specific engines in parallel using the set of task engines and the set of control registers that correspond to the multiple requests of the set of application specific engines.

In another embodiment, a method for controlling a state machine in a parallel processing system may include providing a set of control registers configured to serve a corresponding set of application specific engines, providing a set of task engines configured to access a plurality of application resources in parallel, receiving, by one or more processors, multiple requests from the set of application specific engines for accessing the plurality of application resources, determining, by the one or more processors, availability of the set of task engines, determining, by the one or more processors, availability of the plurality of application resources being requested, assigning, by the one or more processors, the set of task engines to serve the set of application specific engines based on the availability of the set of task engines and the availability of the plurality of application resources being requested, and serving, by the one or more processors, the multiple requests from the set of application specific engines in parallel using the set of task engines and the set of control registers that correspond to the multiple requests of the set of application specific engines.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

DESCRIPTION OF EMBODIMENTS

Methods and systems are disclosed for programmable state machine controller in a parallel processing system. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 2A:
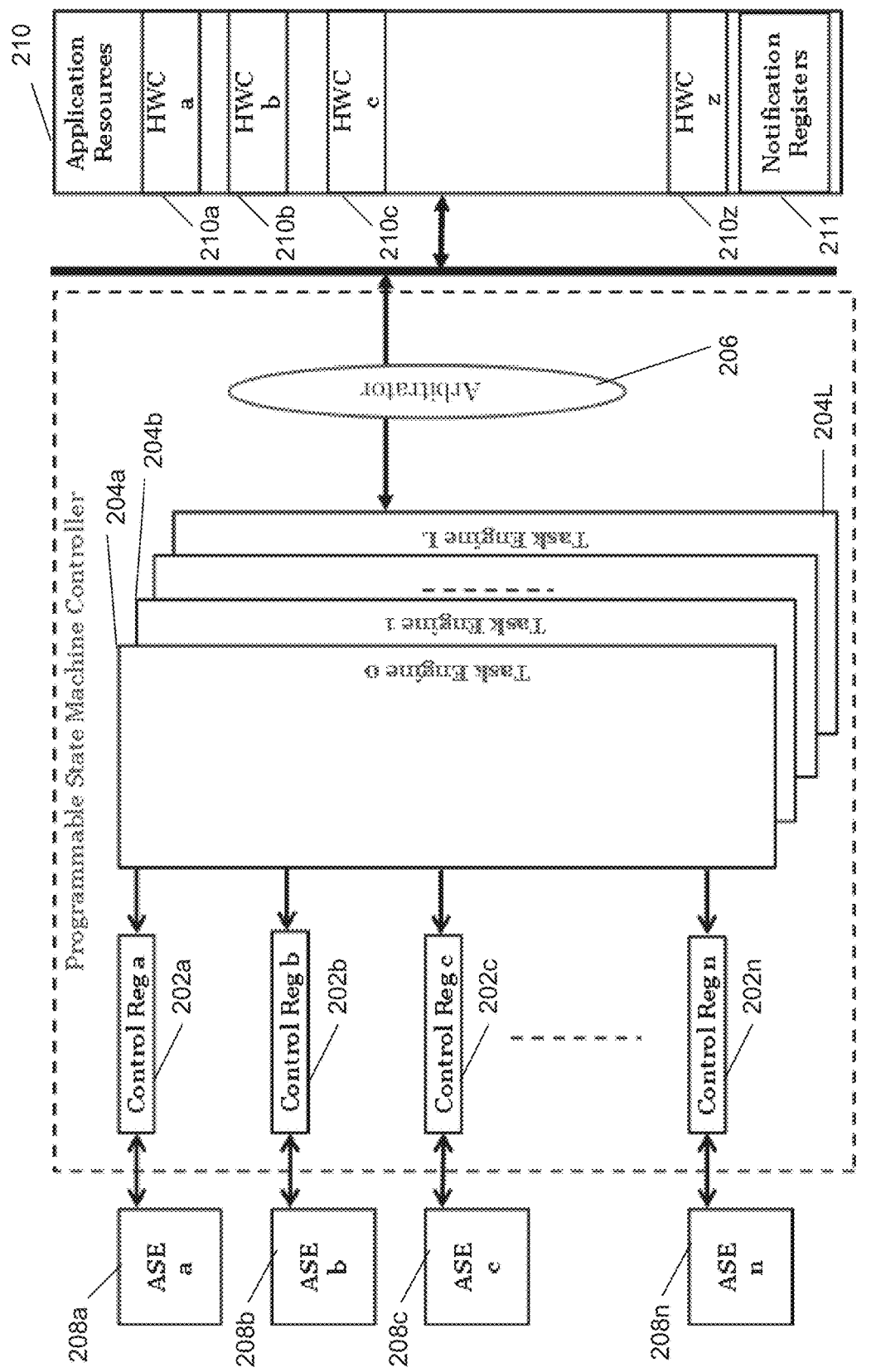
FIG. 2A illustrates an exemplary implementation of a programmable state machine controller in a parallel processing system according to aspects of the present disclosure.

FIG. 2A illustrates an exemplary implementation of a programmable state machine controller in a parallel processing system according to aspects of the present disclosure. In the example shown in FIG. 2A, the programmable state machine controller 200 includes a plurality of control registers, namely control register a through control register n (labelled as 202a, 202b, 202c through 202n); a set of task engines, namely task engine 0 through task engine L (labelled as 204a, 204b through 204L); and arbitrator 206. The content of the plurality of control registers are programmable by the programmable state machine controller to enable each of the control register to perform certain function of a state in a state machine.

Figure 1A:
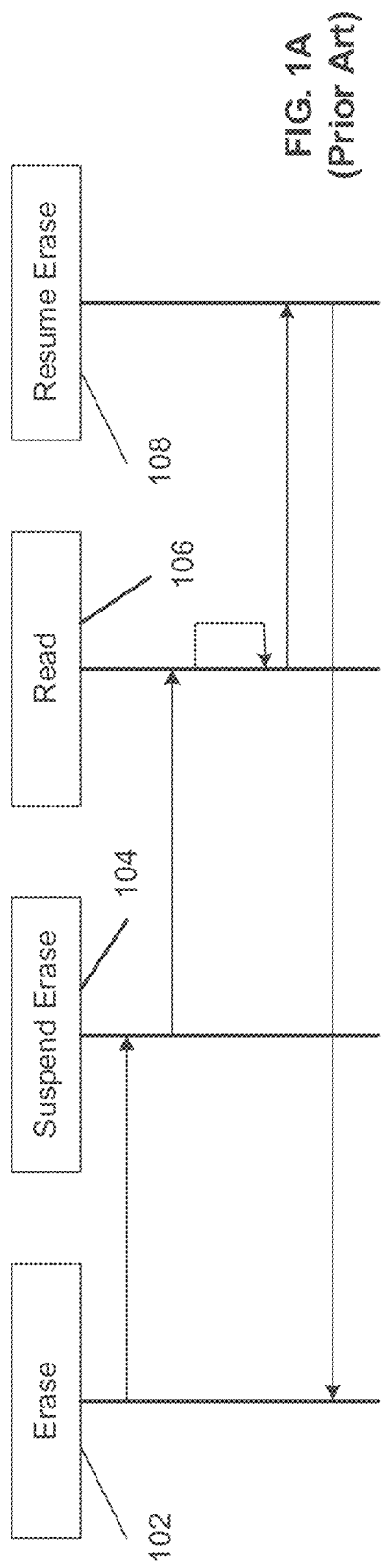
FIG. 1A illustrates a conventional software state machine in a parallel processing system.
Figure 1B:
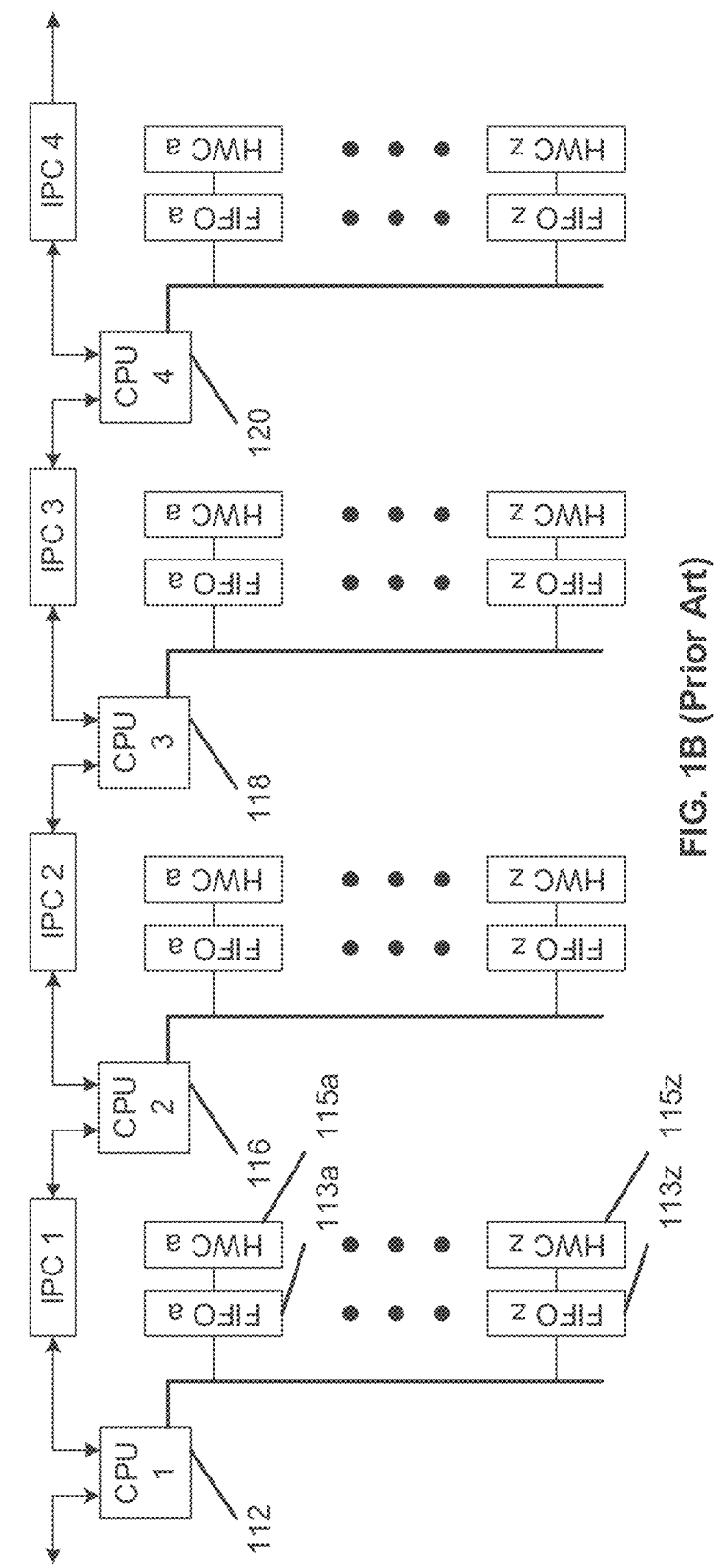
FIG. 1B illustrates an implementation of the conventional software state machine of FIG. 1A in a parallel processing system.
Figure 1C:
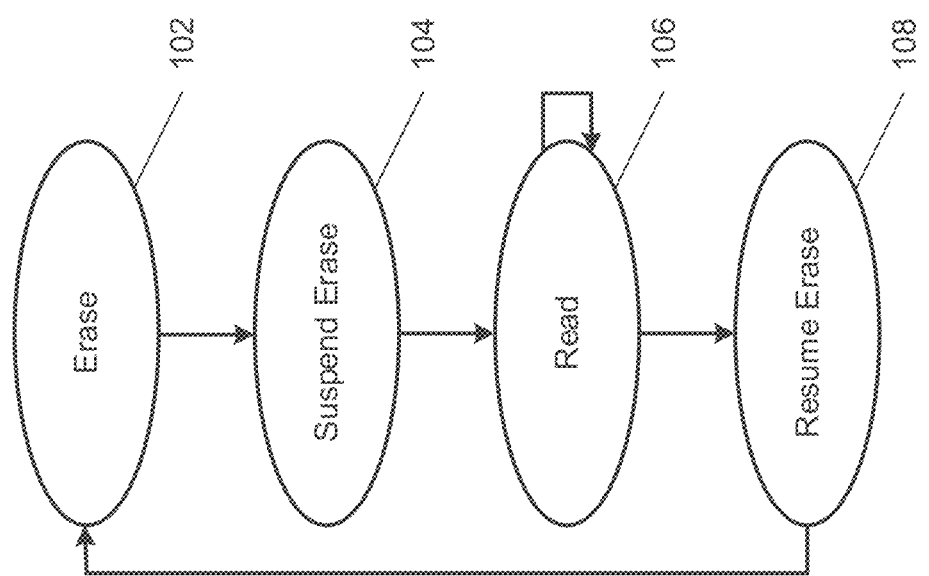
FIG. 1C illustrates a conventional hardware state machine.

According to aspects of the present disclosure, the plurality of control registers are associated with a plurality of application specific engines, namely ASE a, ASE b, ASE c, through ASE n (labelled as 208a, 208b, 208c through 208n). The plurality of application specific engines may be generic CPUs, and when such generic CPUs along with their corresponding control registers can be configured to perform certain function of a state machine. For example, ASE a 208a and control register a 202a can be configured to perform the function of a state in the programmable state machine 200, such as the state of erase 102 as in FIG. 1A or FIG. 1C.

In some other implementations, the plurality of application specific engines may be implemented with application specific integrated circuits and each control register in the plurality of control registers may be included in the corresponding ASE. For example, the control register a 202a may be included in the application specific implementation of ASE a 208a. Similarly, with this implementation, the combination of ASE a 208a and control register a 202a can be configured to perform the function of a state in the programmable state machine 200, such as the state of suspend erase 104 as in FIG. 1A or FIG. 1C.

The set of task engines (204a through 204L) and the arbitrator 206 are configured to assist the plurality of application specific engines (208a through 208n) to access or modify the application resources, based on the priority of the plurality of application specific engines (208a through 208n) and the availability of the application resources 210. In some implementations, the number of task engines (204a through 204L) may be less than the number of application specific engines (202a through 202n) to conserve hardware resources. Each task engine in the set of task engines (204a through 204L) can be configured to setup an application specific engine to access or modify an application resource. For example, a task engine can be configured to perform at least one of the functions of request an application resource, access/modify on the application resource, and release the application resource after completion of the access or operation. The task engine can further be configured to perform at least one of the functions of initialization, push, pop, or status inquiry with respect to the application resources. The arbitrator 206 may be configured to arbitrate the set of task engines (204a through 204L) based on priorities of the corresponding application resources being requested. The arbitrator 206 may further be configured to arbitrate the set of task engines (204a through 204L) based on an indication of percentage of usage of the application resources 210.

According to aspects of the present disclosure, the application resources 210 may include a plurality of application data (not shown) in the form of data arrays that provide indices to the application data. In some applications, the application resources may include a plurality of hardware components or subcomponents (labelled as 210a, 210b, 210c through 210z). The application resources 210 may further include shared notification registers 211 configured to provide statuses of the plurality of application data or to provide statuses of the plurality of hardware components (210a, 210b, 210c through 210z).

Figure 2B:
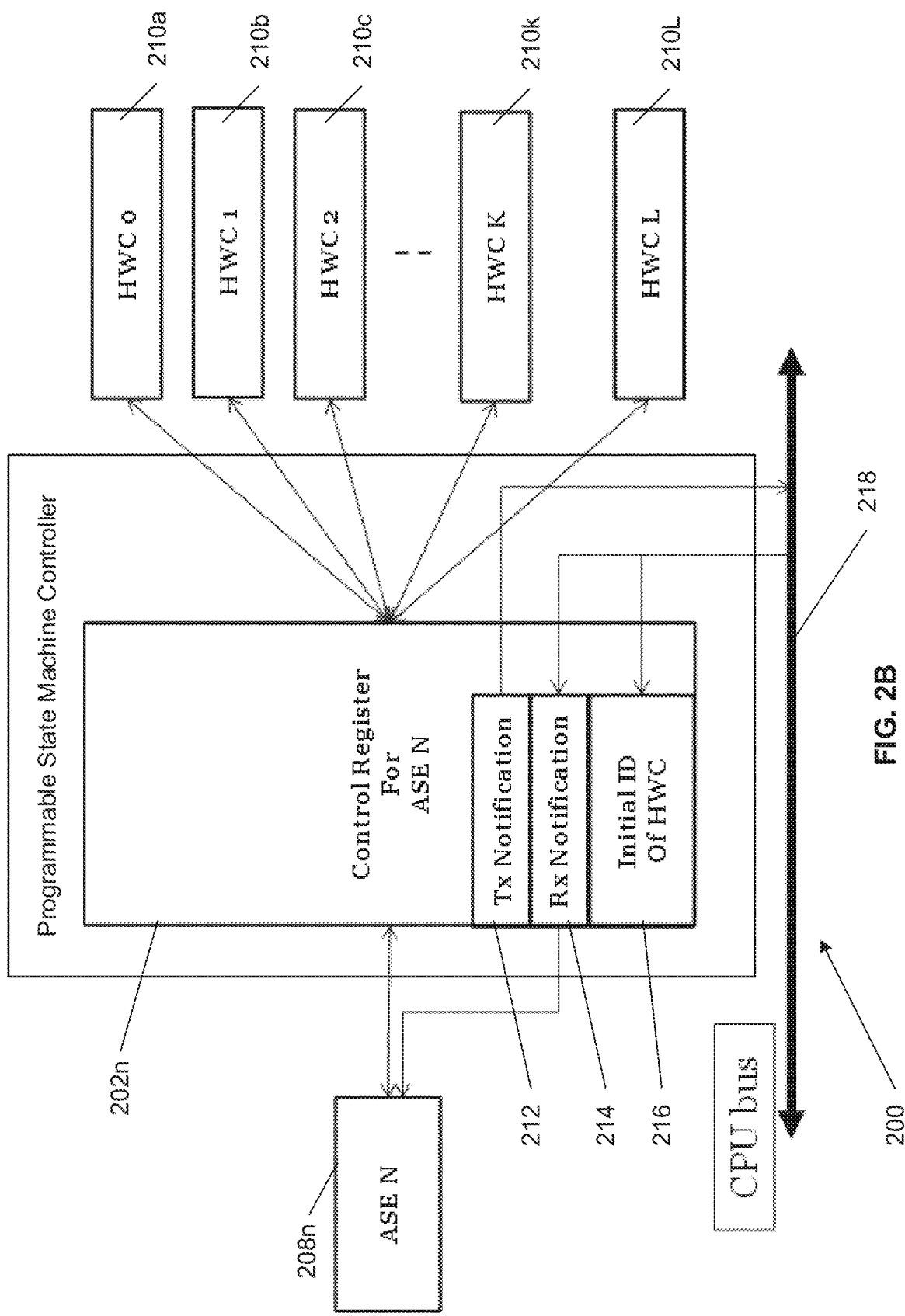
FIG. 2B illustrates an exemplary control register of a programmable state machine controller of FIG. 2A according to aspects of the present disclosure.

FIG. 2B illustrates an exemplary control register of a programmable state machine controller of FIG. 2A according to aspects of the present disclosure. Note that for simplicity, the task engines and the arbitrator are not shown in FIG. 2B. In the example shown in FIG. 2B, control register N 202n may be configured to serve an application specific engine N (ASE N labeled as 208n). The control register for ASE N may include registers for transmit notification 212, receive notification 214, and initial identifier of a hardware component 216 or data array (not shown) in the plurality of application resources. The registers of the control register may be programmed using a CPU bus 218. As shown in this example, the control register 202n for ASE N 208n enables the ASE N 208n to access or modify any one of the application resources, shown as HWC 0, HWC 1, HWC 2, through HWC L (labelled as 210a, 210b, 210c, 210k, and 210L). In other implementations, the application resources may be data arrays that provide indices to the data contents for ASE N 208n.

Figure 2C:
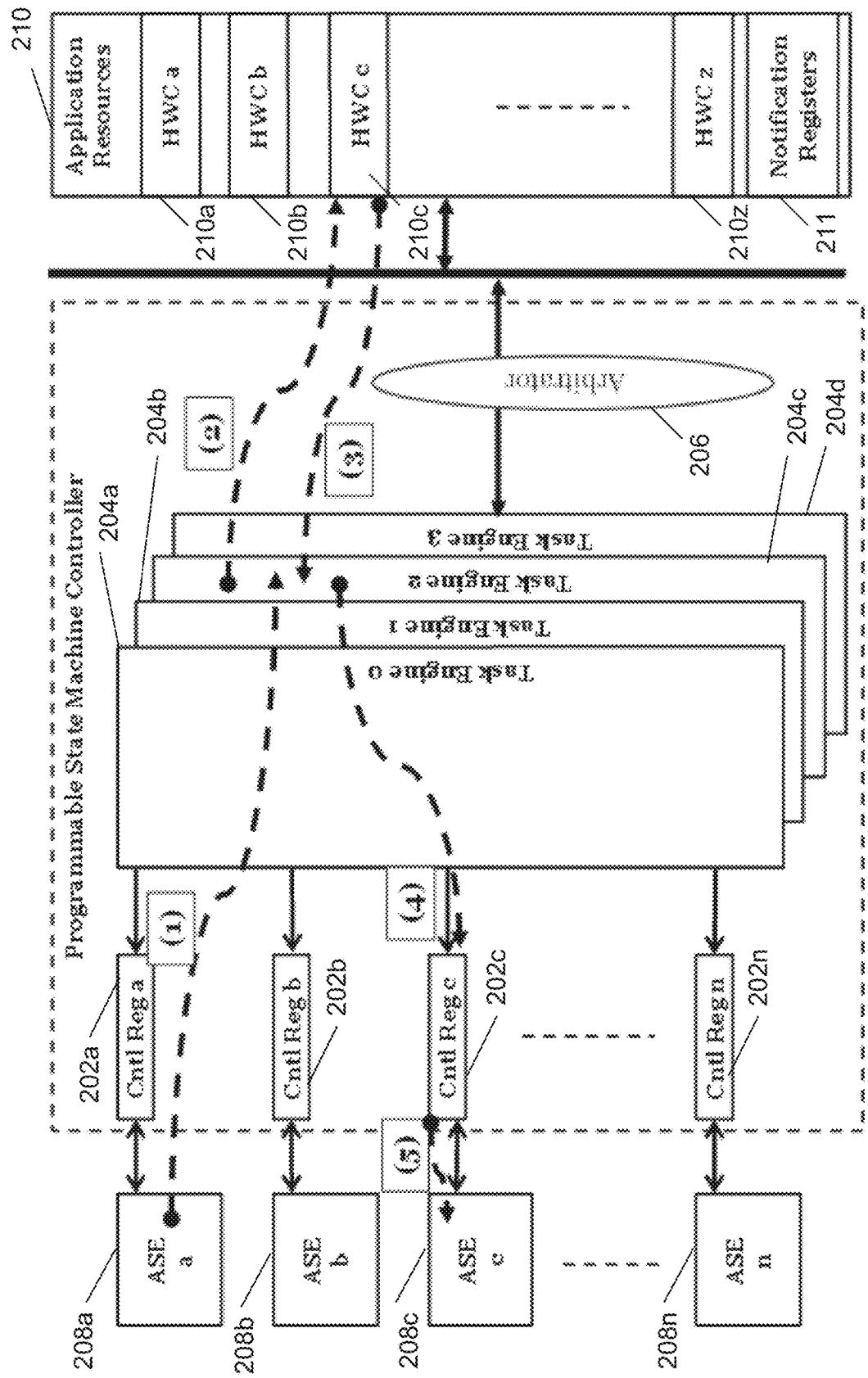
FIG. 2C illustrates an exemplary control flow of the programmable state machine controller of FIG. 2A according to aspects of the present disclosure.

FIG. 2C illustrates an exemplary control flow of the programmable state machine controller of FIG. 2A according to aspects of the present disclosure. Note that the components illustrated in FIG. 2C is the same as in FIG. 2a, and the descriptions of these components are the same as in FIG. 2A and are skipped herein for simplicity. In the exemplary application scenario of FIG. 2C, in step (1), application specific engine a (ASE a labelled as 208a) makes a request to modify hardware component c (HWC c, labelled as 210c) in the plurality of application resources, and control register a (Cntl Reg a labelled as 202a) is configured to serve this transaction by ASE a 208a. Based on the priority of the other requests from the application specific engines and the availability of the task engines (labelled as 204a, 204b, 204c, and 204d in this example), task engine 2 (204c) is assigned to handle this transaction. In step (2), based on the outcome of arbitration by the arbitrator 206, task engine 2 (204c) performs the transaction to modify HWC c (210c). In step (3), application specific engine c (ASE c labelled as 208c) makes a request to access HWC c (210c) in the plurality of application resources 210, and control register c (Cntl Reg c, labelled as 202c) is configured to serve this transaction by ASE c (208c). Based on the priority of the other requests from the application specific engines (208a through 208n) and the availability of the task engines (204a through 204d), task engine 2 (204c) is again assigned to handle this transaction. In step (4) and step (5), task engine 2 (204c) performs the transaction using the control register c (202c), and provides the information received from HWC c (210c) to the application specific engine c (ASE c labelled as 208c).

Note that one of the benefits of the system shown in FIG. 2A-FIG. 2C is that such transactions are performed without software interrupts or inter-processor communications. As a result, the performance of the system can be improved. In addition, different task engines can be configured to serve different transactions between the application specific engines and the application resources, thus enabling processing of the different transactions in parallel when there is no contention in accessing the same application resources. In some implementations, when there is contention in accessing the same application resources, the programmable state machine controller may arbitration such transaction based on the priority of the transactions, allowing the higher priority transaction to be served, and putting the lower priority transaction on hold until the application resource is available and there is task engine available to serve the lower priority transaction. In some other implementation, a FIFO may optionally or additionally be employed to store the lower priority transactions. These lower priority transactions may be services based on the order they are received.

In addition, another benefit of the system shown in FIG. 2A-FIG. 2C is that each application specific engine (ASE) may be configured to perform a specific function, such as the function of a state in a state machine, at runtime, therefore, the system can allow a new state to be added to an existing state machine, or can skip a state in the existing state machine. Both of these capabilities can be useful in modifying the functions of an existing state machine or debugging the functions of the existing state machine, which would not be available in a conventional hardwired hardware state machine design.

Figure 3:
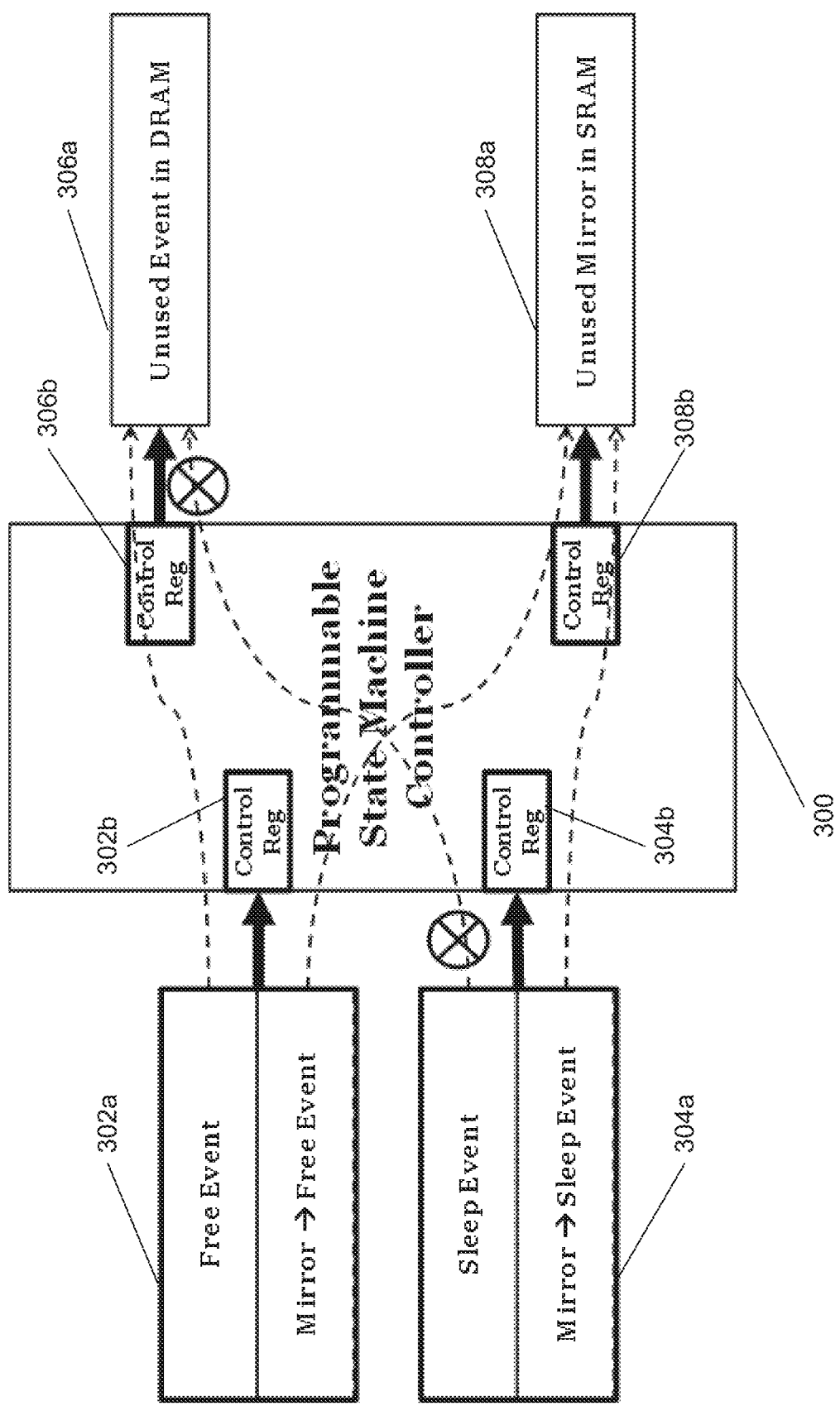
FIG. 3 illustrates an exemplary application of a programmable state machine controller in a parallel processing system according to aspects of the present disclosure.

FIG. 3 illustrates an exemplary application of a programmable state machine controller in a parallel processing system according to aspects of the present disclosure. Note that the components of the programmable state machine controller are substantially similar to those shown in FIG. 2a, and the descriptions of these components are skipped herein for simplicity. In the exemplary application shown in FIG. 3, the programmable state machine 300 is configured to support a state machine having four states, namely, free event 302a, sleep event 304a, unused event in DRAM 306a, and unused event in SRAM 308a. Each state of the state machine is supported by a corresponding control register (302b, 304b, 306b, and 308b). For the free event state 302a, the function to be performed is to mirror a free event, which includes clear information with respect to the free event in SRAM as indicated by the dotted line from the free event state to the unused mirror in SRAM state (i.e. in cache), and clear information with respect to the free event in DRAM as indicated by the dotted line from the free event state to the unused event in DRAM state. For the sleep event state 304a, the function to be performed is to mirror a sleep event, which includes clear information with respect to the free event in SRAM as indicated by the dotted line from the sleep event state to the unused mirror in SRAM state (i.e. in cache), and save the information with respect to the sleep event in DRAM as indicated by crosses on the dotted line from the sleep event state to the unused event in DRAM state. Note that the functions of the free event state 302a, sleep event state 304a, unused mirror in SRAM state 306a, and unused event in DRAM state 308a can be performed without software interrupts or inter-processor communications. As a result, the performance of the system can be improved.

According to aspects of the present disclosure, each of the free event state 302a, sleep event state 304a, unused mirror in SRAM state 306a, and unused event in DRAM state 308a may be implemented with an application specific engine (ASE) with its associated control register. As shown in FIG. 3, one state may call upon another state to perform a part of the functions of the state. In other words, an ASE may call upon another ASE to perform a part of the functions of the ASE. Upon configuring the control registers and based on the priority of the states and the availability of the application resources, the four ASEs may performs its functions in parallel, which in turn can improve the performance of the system.

Figure 4:
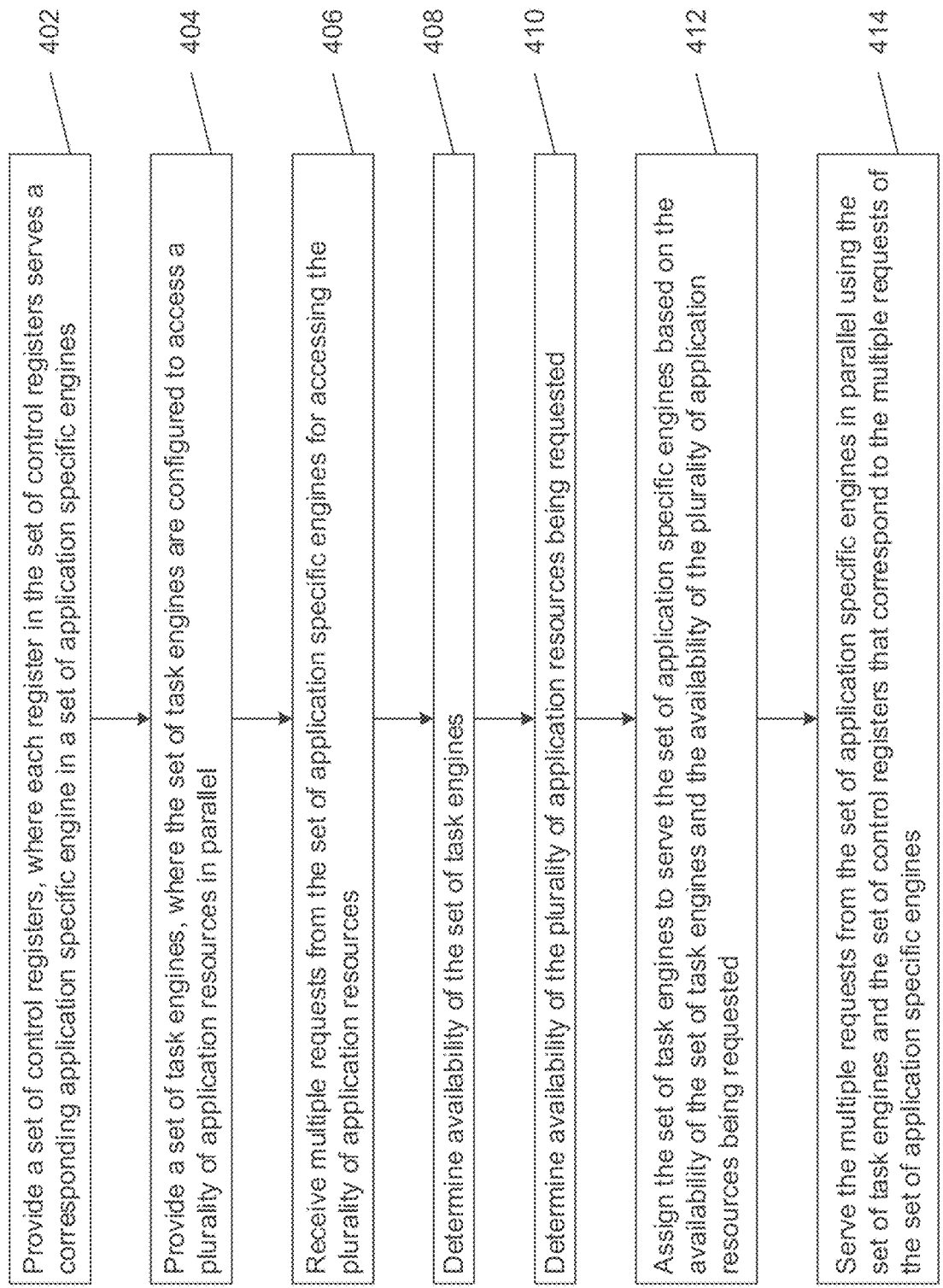
FIG. 4 illustrates an exemplary implementation of a programmable state machine controller in a parallel processing system according to aspects of the present disclosure.

FIG. 4 illustrates an exemplary implementation of a programmable state machine controller in a parallel processing system according to aspects of the present disclosure. As shown in FIG. 4, in block 402, the method provides a set of control registers, wherein each register in the set of control registers serves a corresponding application specific engine in a set of application specific engines. In block 404, the method provides a set of task engines, wherein the set of task engines are configured to access a plurality of application resources in parallel. In block 406, the method receives multiple requests from the set of application specific engines for accessing the plurality of application resources. In block 408, the method determines availability of the set of task engines. In block 410, the method determines availability of the plurality of application resources being requested. In block 412, the method assigns the set of task engines to serve the set of application specific engines based on the availability of the set of task engines and the availability of the plurality of application resources being requested. In block 414, the method serves the multiple requests from the set of application specific engines in parallel using the set of task engines and the set of control registers that correspond to the multiple requests of the set of application specific engines.

According to aspects of the present disclosure, an application specific engine includes a processor. Optionally or additionally, an application specific engine may include an application specific integrated circuits. The plurality of application resources may include a plurality of data arrays, where each of the data array in the plurality of data array may include indices pointing to information associated with an application resource. Optionally or additionally, the plurality of application resources may include a plurality of hardware components, where each hardware component in the plurality of hardware components is configured to perform a specific function. The each register in the set of control registers may include at least one of: 1) an identifier of an application resource to be accessed; 2) a starting address of the application resource to be accessed; 3) a write address; 4) a read address; 5) a lock indicator configured to indicate whether the application specific engine is being served; or 6) some combination thereof.

According to aspects of the present disclosure, determine the availability of the set of task engines may include arbitrate the set of task engines based on priorities of the corresponding application specific engines being served by the set of task engines. Determine the availability of the plurality of application resources being requested may include at least one of: 1) access shared notification registers of the plurality of application resources to obtain availability of the plurality of application resources; 2) arbitrate the set of task engines based on priorities of the corresponding application resources being requested; 3) arbitrate the set of task engines based on an indication of percentage of usage of the plurality of application resources; 4) read the shared notification registers of the plurality of application resources to obtain statuses of the plurality of application resources; or 5) some combination thereof. The method of programmable state machine controller may further include set the shared notification registers of an application resource upon completion of accessing the application resource.

Figure 5:
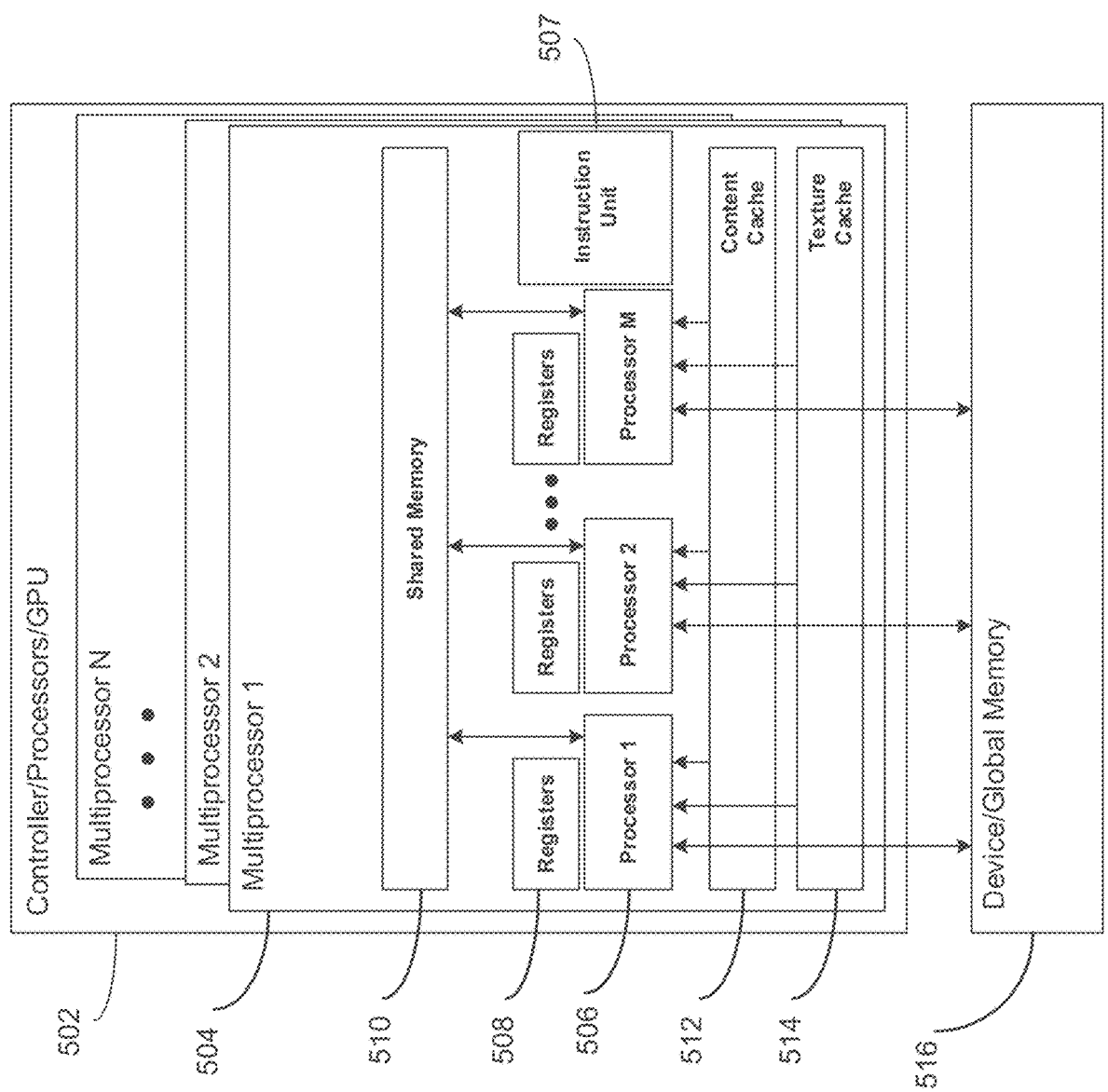
FIG. 5 illustrates an exemplary programmable state machine controller according to aspects of the present disclosure.

According to aspects of the present disclosure, one or more central processing units (CPUs) or graphic processing units (GPUs) may be configured to control the slow RAM, the set of fast RAMs, and the set of the queue control engines. FIG. 5 illustrates an exemplary programmable state machine controller according to aspects of the present disclosure. As shown in FIG. 5, each controller 502 includes N multiprocessors. Each multiprocessor 504 further includes M processors 506 and an instruction unit 507. Each processor has its own registers 508. All the processors 506 in one multiprocessor 504 share a block of shared memory 510. All the processors share the same set of constant cache 512 and texture cache 514 memories. They can also access the data in device memory 516, which is also referred to as the global memory.

In this example, each multiprocessor 504 has a block of shared memory. Accessing data from the shared memory 510 is much faster than accessing data from the device (global) memory 516. For this reason, one approach to increase computational efficiency is to load the data from the global memory 516 to the shared memory 510, perform much of the computations/manipulations using the shared memory 510, and then write back the results from the shared memory 510 to the global memory 516.

Controller 502 may include a plurality of multiprocessors, such as multiprocessor 1 through multiprocessor N. In this example, each of processor may be configured to execute tasks. The tasks may be of different types, and, in some examples, each respective type of task may be stored in or associated with a respective task queue while waiting for execution by a processor. The different types of tasks may include, for example, front end tasks, which may include receiving and interpreting instructions received from host device 4. Other types of tasks including caching; back-end tasks, which may include reading data from or writing data to NVM 10; housing-keeping, which may include garbage collection, wear leveling, TRIM, or the like; and system tasks. In some examples, each processor may be referred to as a compute unit, a processing unit, a core, or a central processing unit (CPU).

In accordance with examples of this disclosure, a first processor 506 may be configured to operate as a scheduler that schedules tasks for execution by at least one other processor. First processor 506 may assign tasks from a plurality of task queues to at least one other processor. As described above, each of the task queues may be associated with a task type.

In contrast to some other scheduling techniques, each task queue is associated with a respective priority ratio, and the priority ratio defines the frequency with which tasks from the respective task queue are scheduled by first processor 506 to be executed by the at least one processor. The respective priority ratio for each task queue may be based at least in part on the number of tasks in the respective task queue. In this way, the respective priority ratios are reflective of a number of tasks in the respective task queues, and the frequency with which tasks from a task queue are assigned by first processor 506 for execution is based at least in part on the number of tasks in the task queue.

In some examples, the respective priority ratios may be updated from time to time, such that the respective priority ratios are reflective of a current or recent number of tasks in the respective task queues. In this way, the techniques described herein may facilitate auto prioritization of the respective task queues based at least in part on the number of tasks currently or recently in the task queue.

For example, first processor 506 may determine the respective priority ratio associated with each task queue based at least in part on a number of tasks in the respective task queue. In some examples, first processor 506 additionally may base the priority ratio on a type of task associated with the respective task queue. For example, front-end tasks may have a higher priority than house-keeping tasks or system tasks. The priority ratio may define a relative frequency with which first processor 506 assigns task from the respective task queues to the at least one other processor. First processor 506 may update the respective priority ratio from time to time to adjust for the number of tasks in the respective task queue.

In some examples, first processor 506 may assign tasks from the respective task queues to the at least one other processor by progressing through tasks associated with the respective task queues in a predetermined order in which the task queues are interleaved. First processor 506 may determine whether to send a task from a respective task queue to be executed by at least one other processor based on the priority ratio of the respective task queue, which may be a ratio of execute indicators to skip indicators. In this way, when the priority ratio associated with a respective task queue is higher, first processor 506 assigns tasks from the respective task queue to the at least one other processor more often than when the priority ratio associated with the respective task queue is lower. Further, assuming the priority ratio is greater than zero, first processor 506 continues to assign tasks from each respective task queue to the at least one other processor.

Figure 6:
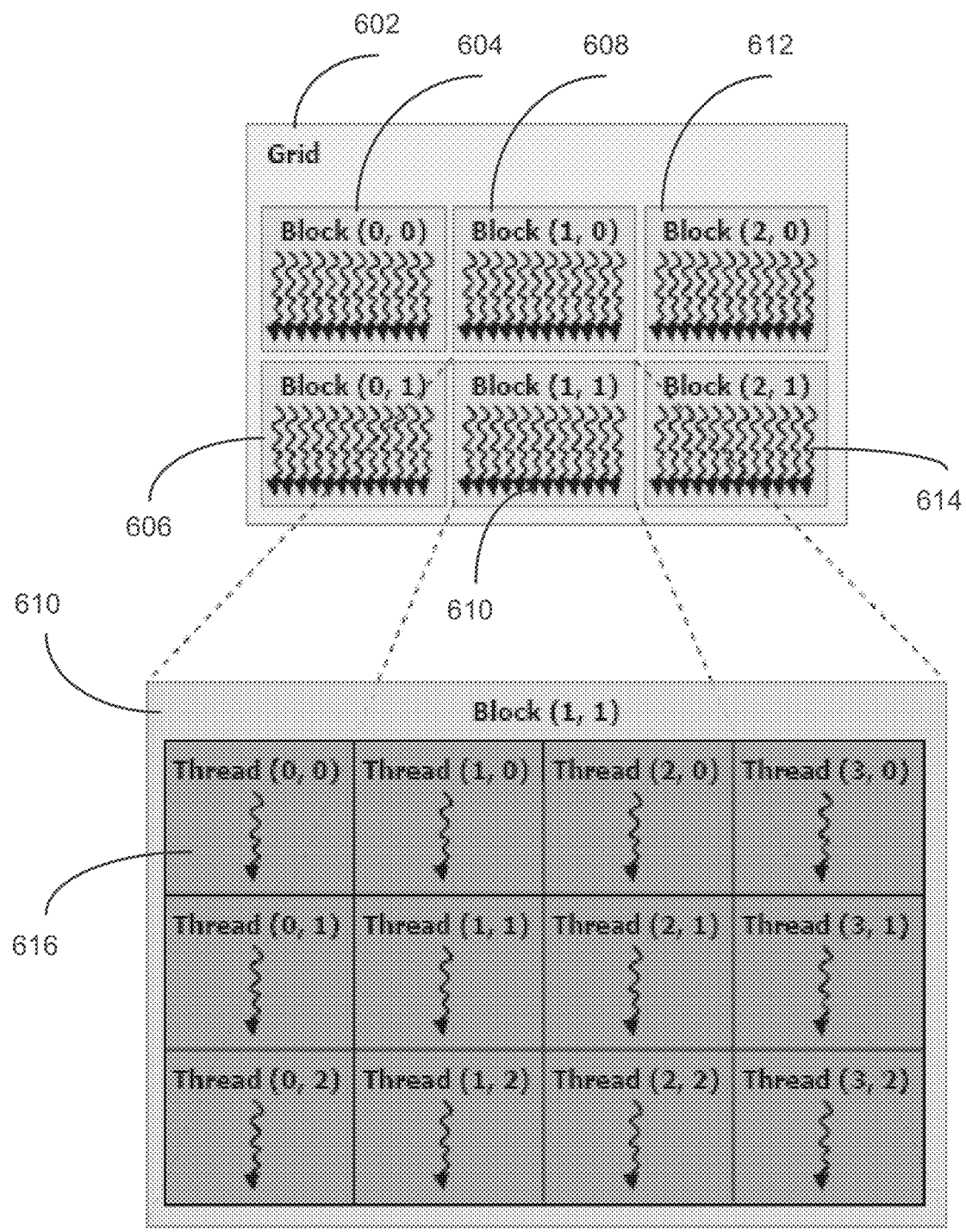
FIG. 6 illustrates an exemplary arrangement of threads in a programmable state machine controller according to aspects of the present disclosure.

FIG. 6 illustrates an exemplary arrangement of threads in a programmable state machine controller according to aspects of the present disclosure. In this example, threads are arranged in a grid 602, and they are divided into blocks of threads, for example block (0,0) 604, block (0,1) 606, block (1,0) 608, block (1,1) 610, block (2,0) 612, and block (2,2) 614. Each block of threads (for example block (1,1) 610, is assigned to one multiprocessor and threads within one block, for example thread (0,0) 616, can communicate with each other using the shared memory as described in association with FIG. 5.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, and firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A programmable state machine controller in a parallel processing system, comprising:
    a set of control registers, wherein each control register in the set of control registers is configured to serve a corresponding application specific engine in a set of application specific engines, wherein the each control register and its corresponding application specific engine are configured to perform functions of a state in a programmable state machine, and wherein the each control register comprises an identifier of an application resource to be accessed and a lock indicator configured to indicate whether the application specific engine is being served;
    a set of task engines, wherein the set of task engines are configured to access a plurality of application resources in parallel;
    one or more processors configured to:
    receive multiple requests from the set of application specific engines for accessing the plurality of application resources;
    determine availability of the set of task engines;
    determine availability of the plurality of application resources being requested;
    assign the set of task engines to serve the set of application specific engines based on the availability of the set of task engines and the availability of the plurality of application resources being requested; and
    serve the multiple requests from the set of application specific engines in parallel using the set of task engines and the set of control registers that correspond to the multiple requests of the set of application specific engines.

2. The programmable state machine controller of claim 1, wherein an application specific engine includes a processor.

3. The programmable state machine controller of claim 1, wherein an application specific engine includes application specific integrated circuits.

4. The programmable state machine controller of claim 1, wherein
    the plurality of application resources includes a plurality of data arrays, wherein each of the data array in the plurality of data array include indices pointing to information associated with an application resource.

5. The programmable state machine controller of claim 1, wherein
    the plurality of application resources includes a plurality of hardware components, wherein each hardware component in the plurality of hardware components is configured to perform a specific function.

6. The programmable state machine controller of claim 1, wherein determining the availability of the set of task engines comprises:
    arbitrating the set of task engines based on priorities of the corresponding application specific engines being served by the set of task engines.

7. The programmable state machine controller of claim 1, wherein determining the availability of the plurality of application resources being requested comprises at least one of:
    accessing a shared notification register of the plurality of application resources to obtain availability of the plurality of application resources;
    arbitrating the set of task engines based on priorities of the corresponding application resources being requested;
    arbitrating the set of task engines based on an indication of percentage of usage of the plurality of application resources;
    reading a shared notification register of the plurality of application resources to obtain status of the plurality of application resources; or
    some combination thereof.

8. The programmable state machine controller of claim 1, wherein the one or more processors are further configured to:
    set a shared notification register of an application resource upon completion of accessing the application resource.

9. The programmable state machine controller of claim 1, wherein the one or more processors are further configured to:
    add a new state to the programmable state machine or skip an existing state in the programmable state machine of a hardware state machine design.

10. The programmable state machine controller of claim 9, wherein the one or more processors are further configured to:
    modify functions of the programmable state machine or debug the functions of the programmable state machine of the hardware state machine design.

11. A method for controlling a state machine in a parallel processing system, comprising:
    providing a set of control registers, wherein each control register in the set of control registers is configured to serve a corresponding application specific engine in a set of application specific engines, wherein the each control register and its corresponding application specific engine are configured to perform functions of a state in a programmable state machine, and wherein the each control register comprises an identifier of an application resource to be accessed and a lock indicator configured to indicate whether the application specific engine is being served;
    providing a set of task engines, wherein the set of task engines are configured to access a plurality of application resources in parallel;
    receiving, by one or more processors, multiple requests from the set of application specific engines for accessing the plurality of application resources;
    determining, by the one or more processors, availability of the set of task engines;
    determining, by the one or more processors, availability of the plurality of application resources being requested;

assigning, by the one or more processors, the set of task engines to serve the set of application specific engines based on the availability of the set of task engines and the availability of the plurality of application resources being requested; and serving, by the one or more processors, the multiple requests from the set of application specific engines in parallel using the set of task engines and the set of control registers that correspond to the multiple requests of the set of application specific engines.

12. The method of claim 11, wherein an application specific engine includes a processor.

13. The method of claim 11, wherein an application specific engine includes application specific integrated circuits.

14. The method of claim 11, wherein
the plurality of application resources includes a plurality of data arrays, wherein each of the data array in the plurality of data array include indices pointing to information associated with an application resource.

15. The method of claim 11, wherein
the plurality of application resources includes a plurality of hardware components, wherein each hardware component in the plurality of hardware components is configured to perform a specific function.

16. The method of claim 11, wherein determining the availability of the set of task engines comprises:
arbitrating the set of task engines based on priorities of the corresponding application specific engines being served by the set of task engines.

17. The method of claim 11, wherein determining the availability of the plurality of application resources being requested comprises at least one of:

accessing a shared notification register of the plurality of application resources to obtain availability of the plurality of application resources;

arbitrating the set of task engines based on priorities of the corresponding application resources being requested;

arbitrating the set of task engines based on an indication of percentage of usage of the plurality of application resources;

reading a shared notification register of the plurality of application resources to obtain status of the plurality of application resources; or some combination thereof.

18. The method of claim 11, further comprising:
setting a shared notification register of an application resource upon completion of accessing the application resource.

19. The method of claim 11, further comprising:
adding a new state to the programmable state machine or skipping an existing state in the programmable state machine of a hardware state machine design.

20. The method of claim 19, further comprising:
modifying functions of the programmable state machine or debugging the functions of the programmable state machine of the hardware state machine design.

* * * * *